United States Patent [19]

Suzuki

[11] Patent Number: 4,664,082

[45] Date of Patent: May 12, 1987

[54] METHOD OF DETECTING ABNORMALITY IN A REFERENCE CRANK ANGLE POSITION DETECTION SYSTEM OF AN INTERNAL COMBUSTION ENGINE

[75] Inventor: Yoshio Suzuki, Wakoh, Japan

[73] Assignee: Honda Giken Kogyo K.K., Tokyo, Japan

[21] Appl. No.: 823,579

[22] Filed: Jan. 29, 1986

[30] Foreign Application Priority Data

Feb. 1, 1985 [JP] Japan .................................. 60-016423
Feb. 1, 1985 [JP] Japan .................................. 60-016424

[51] Int. Cl.[4] ........................... F02P 11/00; F02P 5/15
[52] U.S. Cl. ..................................... 123/414; 123/479; 123/630
[58] Field of Search ............... 123/414, 416, 417, 479, 123/630

[56] References Cited

U.S. PATENT DOCUMENTS 4,471,739  9/1984  Yamato et al. ...................... 123/479
4,476,830  10/1984  Hasegawa et al. ................... 123/479

FOREIGN PATENT DOCUMENTS 30766  10/1975  Japan .
46671  10/1983  Japan .

Primary Examiner—Tony M. Argenbright
Attorney, Agent, or Firm—Arthur L. Lessler

[57] ABSTRACT

A method of detecting abnormality in a reference crank angle position detection system of a control system for controlling an internal combustion engine, the control system using at least reference pulses generated, respectively, at predetermined crank angles of the crankshaft and detected by the detection system, and crank angle pulses generated, respectively, at predetermined angles of the crankshaft and with a pulse repetition period shorter than that of the reference pulses, for controlling the engine. Counting of crank angle pulses is started from the time each reference pulse is generated. It is determined whether or not one reference pulse has been generated between an immediately preceding crank angle pulse and a present one, when the counted value is equal to a predetermined value. If not, it is decided that abnormality exists in the occurrence of reference pulses. Alternatively, a number of times of execution of the above determination are counted when the determination result is negative, to decide that abnormality exists in the occurrence of reference pulses when the counting has been continually effected until the counted value reaches a predetermined value.

6 Claims, 9 Drawing Figures

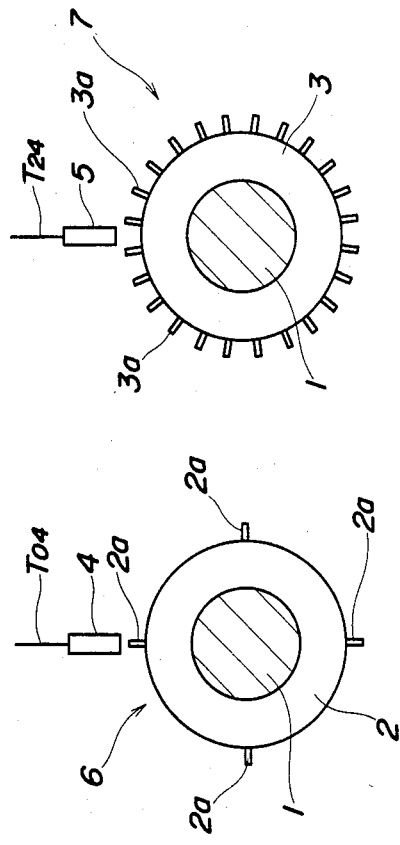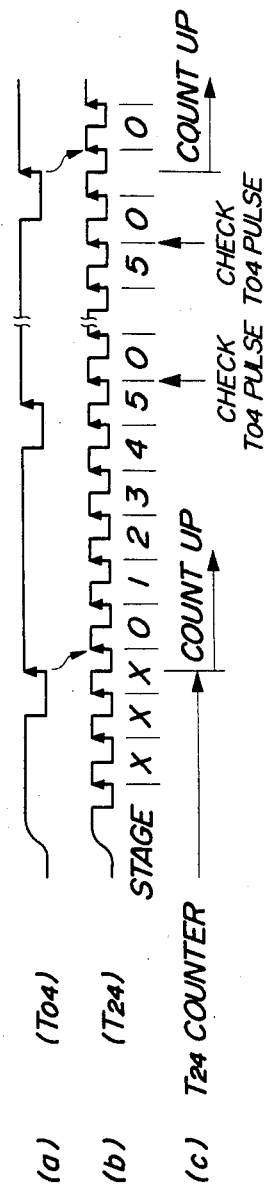

FIG. 5
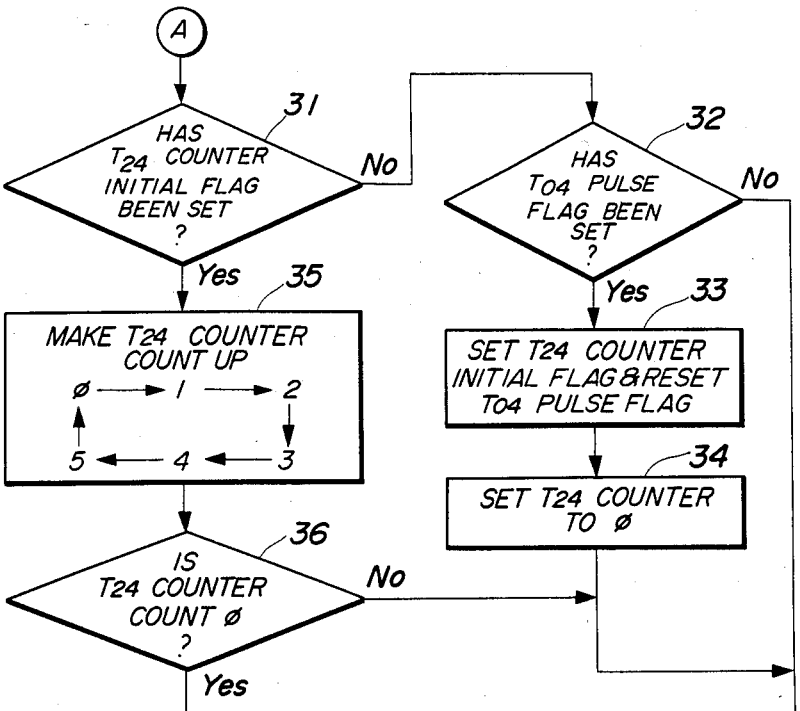
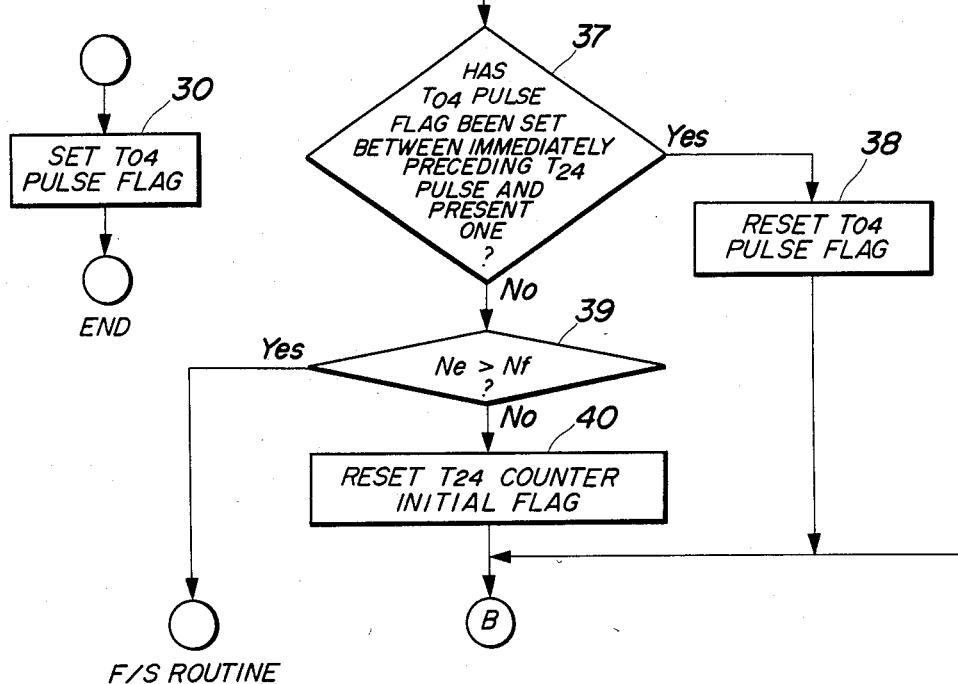

METHOD OF DETECTING ABNORMALITY IN A REFERENCE CRANK ANGLE POSITION DETECTION SYSTEM OF AN INTERNAL COMBUSTION ENGINE

BACKGROUND OF THE INVENTION

This invention relates to a method of detecting abnormality in a reference crank angle position detection system of an internal combustion engine.

Amongst various engine operation control methods, an ignition timing control method for an internal combustion engine has been proposed e.g. by Japanese Patent Publication No. 50-30766 which is adapted to electronically control the ignition timing of the engine in response to two input signals, i.e. reference pulses generated at predetermined crank angles of the engine as the crankshaft rotates, and crank angle pulses having a shorter pulse repetition period than that of the reference pulses and generated at other predetermined crank angles of the engine.

Of the above two input signals, the reference pulses are generally essentially employed in control of other engine operations such as fuel injection control, and fixed crank angle ignition control effected at low engine speeds such as cranking speed or upon failure of the control system for fail-safe purposes. However, the reference pulses can often undergo intrusion of noise between adjacent ones of the reference pulses which is ascribable to their longer pulse repetition period than that of the crank angle pulses, often causing malfunction of the control system. For example, in a control system using a counter which counts the crank angle pulses with reference to the reference pulses, the counted value entirely depends upon the occurrence of reference pulses such that if a reference pulse fails to be generated at a normal time, the counter is not reset, rendering the engine operation control ineffective and accordingly impeding continued engine operation. Therefore, it is indispensable to detect abnormality in the occurrence of reference pulses without delay, and take appropriate measures so as to ensure continued engine operation in the event of occurrence of such abnormality.

To meet such requirement, it has been proposed e.g. by Japanese Patent Publication No. 58-46671 to monitor an output from an electronic control system for an internal combustion engine, and renders a decision that abnormality has occurred in the electronic control system, after the lapse of a predetermined period of time after the output has ceased to be generated.

However, this proposed method is only capable of detecting abnormality in a control circuit per se of the electronic control system, but it is not capable of detecting abnormality in the occurrence of the aforementioned reference pulses, etc. or sensors for detecting such pulses.

SUMMARY OF THE INVENTION

It is therefore the object of the invention to positively detect without delay abnormality in a reference crank angle position detection system of an internal combustion engine.

The present invention provides a method of detecting abnormality in a reference crank angle position detection system of a control system for controlling an internal combustion engine having a crankshaft, the control system using at least reference pulses generated, respectively, at predetermined crank angles of the crankshaft and detected by the reference crank angle position detection system, and crank angle pulse generated, respectively, at other predetermined angles of the crankshaft and with a pulse repetition period shorter than that of the reference pulses, for controlling the engine.

The method according to the inventon is characterized by comprising the following steps: (1) monitoring the generation of the reference pulses through detection of the reference crank angle position detection system; (2) starting counting the crank angle pulses from the time each of the reference pulses is generated; (3) determining whether or not the counted value of the crank angle pulses is equal to a predetermined value; (4) determining, through the detection of the reference crank angle position detection system, whether or not there has been generated one of the reference pulses between an immediately preceding one of the crank angle pulses and a present one of same, when it is determined at the step (3) that the counted value of the crank angle pulses is equal to the predetermined value; and (5) rendering a decision that there occurs abnormality in the occurrence of the reference pulses when it is determined at the step (4) that none of the reference pulses has been generated between the immediately preceding one of the crank angle pulses and the present one of same.

Alternatively, the following steps may be executed as another embodiment: counting a number of times of execution of the step (4) when the step (4) gives the determination result that none of the reference pulses has been generated between the immediately preceding one of the crank angle pulses and the present one of same; and rendering a decision that there exists abnormality in the occurrence of the reference pulses when the counting of the immediately preceding step has been continually effected at every execution of the step (4) until the counted value reaches a predetermined value.

BRIEF DESCRIPTION OF THE DRAWINGS

FIG. 1 (a) shows a reference pulse sensor for sensing reference pulses generated at predetermined crank angles of an internal combustion engine;

FIG. 1 (b) shows a crank angle pulse sensor for sensing crank angle pulses generated at other predetermined angles of the engine;

FIGS. 2(a–c) show a timing chart of pulses generated by the sensors of FIGS. 1 (a) and (b), given by way of example;

FIG. 4 is a flowchart of part of a program for executing the method of the invention;

FIG. 5 is a flowchart of the major part of the program for executing the method of the invention, according to an embodiment of the method of the invention.

DETAILED DESCRIPTION

Figure 3:
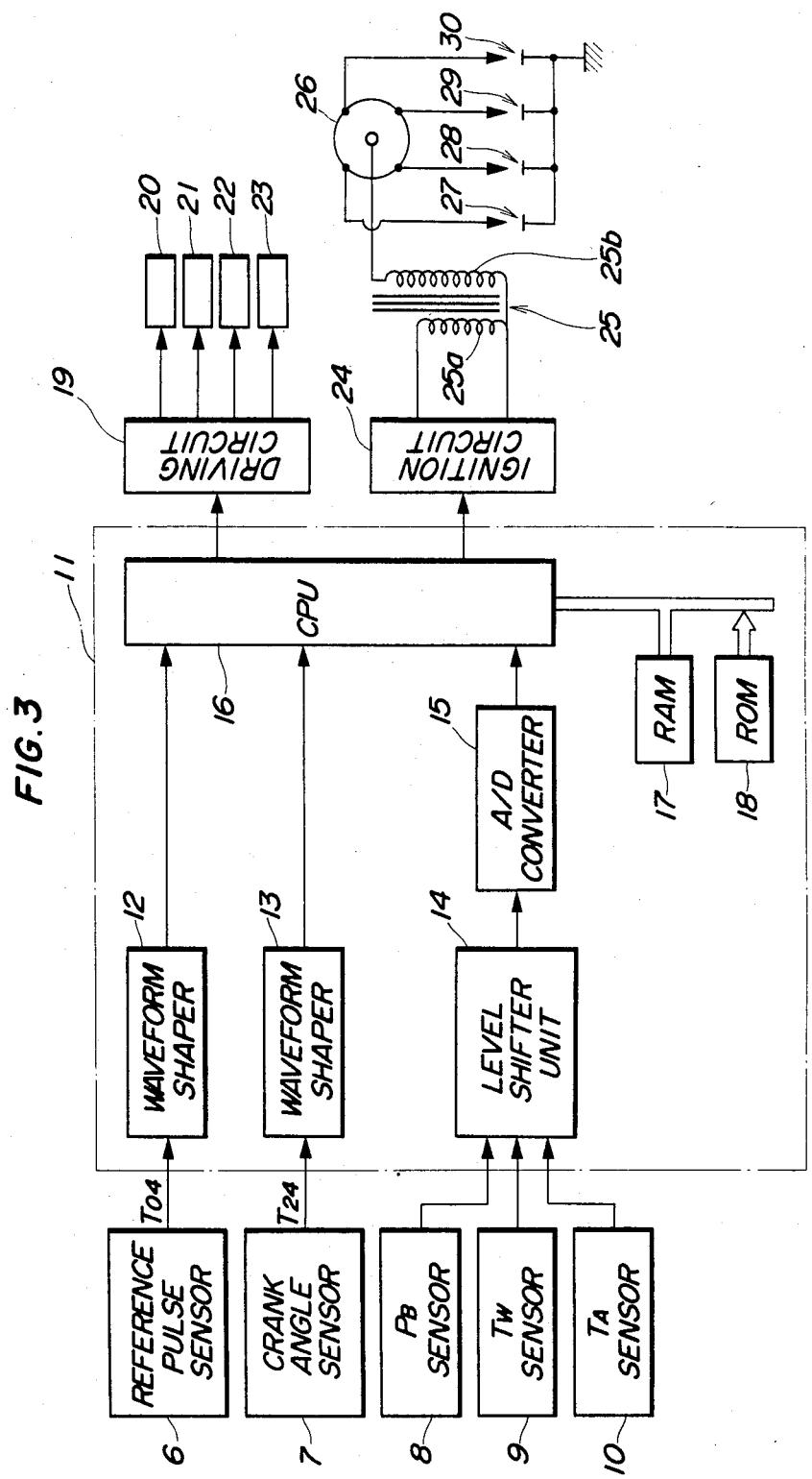
FIG. 3 is a block diagram of a control system of the engine, given by way of example.

The method of the invention will now be described in detail with reference to the drawings.

Referring first to FIGS. 1 (a) and (b), there are shown sensors for sensing predetermined crank angles of an internal combustion engine. In the figures, reference numeral 1 designates a camshaft which rotates through one rotation (360 degrees) per one cycle of the engine, i.e. per two rotations of a crankshaft of the engine. Arranged on the camshaft 1 at a predetermined axial interval are rotors 2 and 3. The rotor 2 has its peripheral surface formed with a plurality of, e.g. 4, radially outwardly extending protuberances 2a of a predetermined width corresponding in number to the number of cylinders of the engine and circumferentially arranged at equal intervals, e.g. at intervals of 90 degrees. On the other hand, the rotor 3 has its peripheral surface formed with a plurality of, e.g. 24, radially outwardly extending protuberances 3a circumferentially arranged at equal intervals, e.g. at intervals of 15 degrees smaller than the intervals of the protuberances 2a on the rotor 2.

A sensor pickup 4, which is formed of a pickup coil, is arranged at a location radially outward of the rotor 2 so as to become opposed to each of the protuberances 2a with a small gap therebetween as the rotor 2 rotates, to thereby generate a pulse signal T04 as shown in (a) of FIG. 2, through a waveform shaper 12 shown in FIG. 3. Similarly, another sensor pickup 5 is arranged at a location radially outward of the rotor 3 to become opposed to each of the protuberances 3a with a small gap therebetween as the rotor 3 rotates to thereby generate a pulse signal T24 as shown in (b) of FIG. 2, through a waveform shaper 13 shown in FIG. 3. The rotor 2 and the sensor pickup 4 cooperatively form a reference pulse sensor 6 which thus generates one pulse of the signal T04 (hereinafter called "reference pulse") with respect to each of the engine cylinders at a predetermined crank angle or each time the camshaft rotates through 90 degrees (per one quarter rotation of the camshaft), as the crankshaft rotates. On the other hand, the rotor 3 and the sensor pickup 5 cooperatively form a crank angle sensor 7 which thus generates one pulse of the signal T24 (hereinafter called "crank angle pulse") at a predetermined crank angle or each time the crankshaft rotates through 30 degrees or the camshaft rotates through 15 degrees, with a pulse repetition period much shorter than that of the reference pulse T04. When a crank angle pulse T24 has been detected which is generated immediately following each reference pulse T04, it is regarded that the engine is in one of the predetermined reference crank angle positions.

FIG. 3 illustrates the whole arrangement of an electronic control system for executing the method of the invention. Reference pulses T04 and crank angle pulses T24 generated, respectively, from the reference pulse sensor 6 and the crank angle sensor 7 are supplied to an electronic control unit 11 wherein they are supplied, respectively, to the waveform shapers 12, 13 to be shaped into corresponding rectangular waveform pulses, and then are supplied to a central processing unit (hereinafter called "CPU") 16. Further connected to the electronic control unit 11 are other engine parameter sensors, e.g. a PB sensor 8 for sensing absolute pressure PB within an intake pipe of the engine, a TW sensor 9 for sensing engine cooling water or coolant temperature TW, and a TA sensor 10 for sensing intake air temperature TA within the intake pipe. Output analog signals from these sensors are supplied to a level shifter unit 14 to have their voltage level shifted into a suitable votage level, then converted into corresponding digital signals by an analog-to-digital converter 15, and supplied to the CPU 16.

The CPU 16 is responsive to the engine parameter signals from the aforementioned sensors 6-10 to calculate a fuel injection period, an ignition timing, etc. based upon these engine parameter signals as well as upon the reference pulses T04 and the crank angle pulses T24 in accordance with calculation programs stored in a ROM 18, and output a fuel injection quantity control signal and an ignition timing control signal at respective predetermined stages defined by crank angle pulses T24. The CPU 16 also outputs an ignition timing control signal indicative of a fixed crank angle ignition timing based upon reference pulses T04 at low engine speeds, e.g. below 500 rpm, as well as at operation in fail-safe mode in the event of occurrence of abnormality in the reference crank angle position detection system, so long as the reference pulses T04 are normally generated. Results of the above calculations from the CPU 16 are temporarily stored in a RAM 17.

A driving circuit 19 is actuated by the fuel injection quantity control signal to drive fuel injections valves 20-23 provided for respective engine cylinders, to open for a period of time corresponding to the control signal. An ignition circuit 24 is actuated by the ignition timing control signal to supply an ignition command signal to a primary coil 25a of an ignition coil 25 to deenergize same and cause generation of high voltage in a secondary coil 25b thereof to be successively supplied to spark plugs provided at respective engine cylinders through a distributor 26 rotating in synchronism with rotation of the engine.

As stated before, the reference pulse T04 signal can often undergo intrusion of noise between adjacent pulses of the same signal due to their longer intervals of generation, with a higher probability of such intrusion than the crank angle pulse T24 signal. Also, the reference pulse T04 signal is indispensable for fuel injection quantity control, ignition timing control, particularly for fixed crank angle ignition control at low engine speeds or at operation in fail-safe mode. According to the method of the invention, therefore, the generation of the reference pulse T04 signal is checked through monitoring of the crank angle pulse T24 signal which is more difficult to undergo intrusion of noise as compared with the reference pulse T04 signal.

Now, the method of the invention of detecting abnormality in the occurrence of reference pulses T04 will be described in details with reference to FIG. 2 as well as to FIGS. 4 and 5 showing a first embodiment of the invention.

First, each time a reference pulse T04 is generated, step 30 of FIG. 4 is executed to set a T04 pulse flag to indicate the generation of the reference pulse T04. Then, each time a crank angle pulse T24 is generated, the program in FIG. 5 is executed, wherein it is determined at step 31 whether or not an initial flag for a T24 counter (stage counter) which counts the number of crank angle pulses T24 has been set. This initial flag is set at step 33 to be referred to later. If the answer to step 31 is negative or No, the program proceeds to step 32 wherein it is determined whether or not the T04 pulse flag has been set. If the answer to step 32 is negative or No, the execution of the program of FIG. 5 is immediately terminated.

If the answer to step 32 is affirmative or Yes, that is, if the T04 pulse flag was set at the step 30 of FIG. 4 at the time of generation of a reference pulse T04 immediately before the present crank angle pulse T24, the initial flag for the T24 counter is set and the T04 pulse flag is reset at step 33. Also, the counted value in the T24 counter is set to 0 at step 34, followed by termination of the execution of the program. In this way, at the start of operation the counted value in the T24 counter is set to 0 upon generation of the first reference pulse T24.

The T24 counter is formed by a ring counter which is adapted to count up by one step each time a crank angle pulse T24 is inputted, and after the counted value reaches a predetermined value, e.g. 5, it is reset to 0. In this way, the counted value repeatedly changes in the order of 0, 1, 2, 3, 4, and 5. Therefore, after the counted value in the T24 counter has been reset to 0 by generation of the first reference pulse T04 at the start of operation, the count is renewed to 0 each time six crank angle pulses T24 are generated.

After the initial flag for the T24 counter has been set as stated before, the answer to step 31 which is executed each time a crank angle pulse T24 is generated becomes affirmative or Yes, and accordingly the T24 counter counts up by one step at step 35. Then, it is determined at step 36 whether or not the counted value in the T24 counter is 0. If the answer to step 36 is negative or No, the execution of the program is terminated. If the answer to step 36 is affirmative or Yes, that is, if the counted value in the T 24 counter which has been successively increased to 5 is returned to 0 upon inputting of present crank angle pulse T24, it is determined at step 37 whether or not the T04 pulse flag has been set between an immediately preceding crank angle pulse T24 and a present one, that is, whether or not a next reference pulse T04 has been generated between the immediately preceding and present crank angle pulses T24. If the answer is affirmative or Yes, the T04 pulse flag which has been set by the immediately preceding reference pulse T04 is reset at step 38. It is thus diagnosed that there is no abnormality occurring in the reference crank angle position detection system including the reference pulse T04 sensor 6, followed by termination of the execution of the program.

If the answer to step 37 is hegative or No, that is, if the next reference pulse T04 has not been generated between the immediately preceding and present crank angle pulses T24, when the counted value in the T24 counter resumes 0 upon generation of the present crank angle pulse T24, a determination is made as to whether or not the engine rotational speed Ne is higher than a predetermined value Nf above which fail-safe actions, hereinafter referred to, can be performed, at step 39. If the answer to step 39 is negative or No, that is, if the engine is operating in a very low speed region wherein no fail safe action needs to be performed, such as when the engine is being cranked, the initial flag for the T24 counter is reset at step 40, followed by termination of the execution of the program. This is because the engine rotation cannot be smooth when the engine is operating in such very low speed region, due to engine friction, etc. such that reference pulse signal T04 and crank angle pulse signal T24 cannot be regularly generated, which can result in misjudgment that there occurs abnormality in the control system. Therefore, during such very low speed operation, a decision is not rendered that abnormality exists even if the answer to step 37 is negative or No, and then the execution of fail-safe actions is inhibited.

When the answer to step 39 is affirmative or Yes, that is, if the engine is operating in a predetermined operating condition wherein the engine rotational speed Ne is higher than the predetermined value Nf, it is determined that there is abnormality in the occurrence of reference pulse T04, and then the program proceeds to a fail-safe subroutine. In the fail-safe subroutine, fail-safe actions such as simultaneous fuel injections into all the engine cylinders and fixed crank angle ignition may be effected on the basis of crank angle pulses T24 alone, that is, in synchronism with the counting of the T24 counter formed by a ring counter based upon reference pulses T24 in such a manner that simultaneous fuel injection and fixed crank angle ignition each take place when the T 24 counter shows a predetermined counted value. Further, the fail-safe subroutine may include giving a warning to the driver to inform him of the abnormality in the reference crank angle position detection system including the T04 sensor 6.

The reference pulse sensor and the crank angle sensor may alternatively be of a photoelectric type comprising a plurality of slits formed in the respective rotor, and a projector and a receiver arranged at opposite sides of the slits and opposed to each other, wherein light emitted from the projector and passing through the slits is received by the receiver to detect predetermined crank angle positions.

Figure 6:
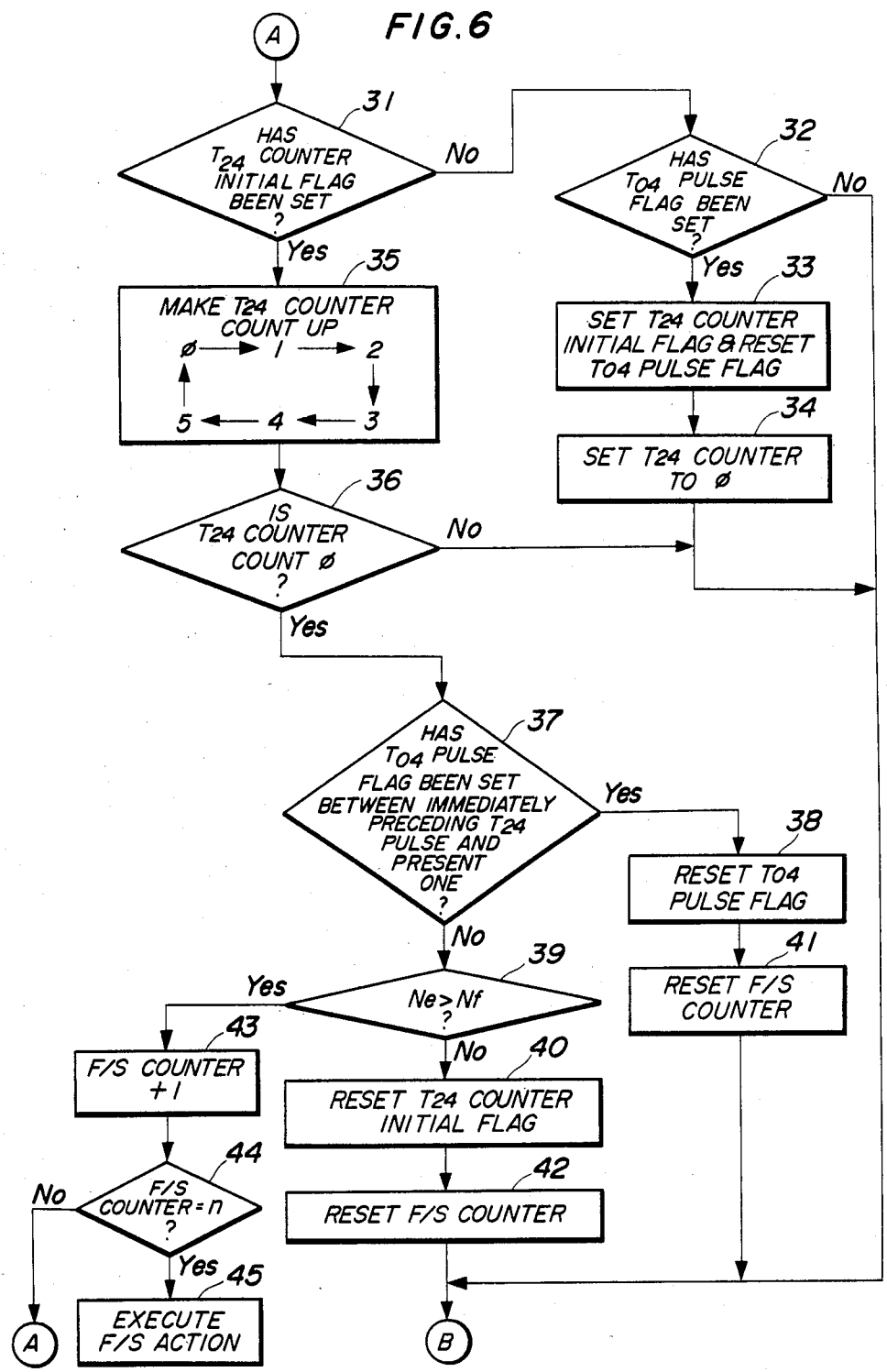
FIG. 6 is a flowchart of the major part of the program for executing another embodiment of the method of the invention.

FIG. 6 shows a second embodiment of the method of the invention, and which is distinguished from the FIG. 5 embodiment by its additional steps 41–45, while the steps 31–40 are identical with those in FIG. 5 and are therefore not described further. Referring to the additional steps 41–45, when the T04 pulse flag has been reset at step 38 by the occurrence of a reference pulse T04 between the immediately preceding and present crank angle pulses T24 determined at step 37, a fail-safe counter (hereinafter called "F/S counter") has its counted value reset at step 40, followed by termination of the execution of the program. This F/S counter is provided to count the number of times of detection of abnormality in the occurrence of reference pulses T04 effected at step 37. Also when the answer to step 39 is negative or No, that is, when the engine is operating in a very low speed region such as at cranking, the F/S counter has its counted value reset at step 42, following the resetting of the initial flag for the T24 counter at step 40.

When the answer to step 39 is affirmative or Yes, that is, if the engine is operating in a predetermined operating condition wherein the engine rotational speed Ne is higher than the predetermined value Nf, the F/S counter counts up by one step at step 43, followed by determining whether or not the counted value is equal to a predetermined value n (e.g. 10) at step 44. If the answer to step 44 is negative or No, the program returns to step 31, while if the answer is affirmative or Yes, the program proceeds to step 45 wherein abnormality in the occurrence of reference pulse T04 is finally determined, and necessary fail-safe actions are performed, such as giving a warning. In this way, only when the counted value in the F/S counter, which is counted up by one step each time abnormality in the reference pulse occurrence is detected at steps 37, 39, reaches the predetermined value n, the step 45 is executed. That is, when the counting of the F/S counter to the predetermined value n has been continually effected without interruption, the fail-safe actions are executed. Therefore, misjudgement on the abnormality occurrence due to noise can be avoided.

As stated above, according to the method of the invention, accurate checking of abnormality in the occurrence of reference pulse T04 caused by a disconnection in the reference pulse sensor or in its wiring, etc. is feasible by the use of a simple program, and without the use of additional devices such as an internal or external counter or timer. Further, according to the second embodiment, when the absence of reference pulse T04 is continually determined a predetermined number of times, a final decision is rendered that there is abnormality in the reference crank angle position detection system, thus making it possible to avoid a misjudgement on the abnormality occurrence ascribable to noise.

What is claimed is:

1. A method of detecting abnormality in a reference crank angle position detection system of a control system for controlling an internal combustion engine having a crankshaft, said control system using at least reference pulses generated, respectively, at predetermined crank angles of said crankshaft and detected by said reference crank angle position detection system, and crank angle pulses generated, respectively, at other predetermined angles of said crankshaft and with a pulse repetition period shorter than that of said reference pulses, for controlling said engine, the method comprising the steps of:

(1) monitoring the generation of said reference pulses through detection of said reference crank angle position detection system;

(2) starting counting said crank angle pulses from the time each of the output pulses from said reference crank angle position detection system is generated;

(3) continuing counting of said crank angle pulses until the counted value reaches a predetermined value without being interrupted by generation of any output pulse from said reference crank angle position detection system, said predetermined value being such a value as is reached immediately after generation of a reference pulse from said reference crank angle detection system if the system is operating normally;

(4) determining whether or not the counted value of said crank angle pulses is equal to a predetermined value;

(5) determining, through the detection of said reference crank angle position detection system, whether or not there has been generated one of said reference pulses between an immediately preceding one of said crank angle pulses and a present one of same, when it is determined at said step (4) that the counted value of said crank angle pulses is equal to said predetermined value; and (6) rendering a decision that there occurs abnormality in the occurrence of said reference pulses when it is determined at said step (5) that none of said reference pulses has been generated between the immediately preceding one of said crank angle pulses and the present one of same.

2. The method as claimed in claim 1, wherein said determination of said step (5) is effected when the rotational speed of said engine is higher than a predetermined value.

3. The method as claimed in claim 1, wherein said counting of said crank angle pulses is effected by the use of a ring counter having a number of counting steps equal to said predetermined value.

4. A method of detecting abnormality in a reference crank angle position detection system of a control system for controlling an internal combustion engine having a crankshaft, said control system using at least reference pulses generated, respectively, at predetermined crank angles of said crankshaft and detected by said reference crank angle position detection system, and crank angle pulses generated, respectively, at other predetermined angles of said crankshaft and with a pulse repetition period shorter than that of said reference pulses, for controlling said engine, the method comprising the steps of: (1) monitoring the generation of said reference pulses through detection of said reference crank angle position detection system; (2) starting counting said crank angle pulses from the time each of said reference pulses is generated; (3) determining whether or not the counted value of said crank angle pulses is equal to a predetermined value; (4) determining, through the detection of said reference crank angle position detection system, whether or not there has been generated one of said reference pulses between an immediately preceding one of said crank angle pulses and a present one of same, when it is determined at said step (3) that the counted value of said crank angle pulses is equal to said predetermined value; (5) counting a number of times of execution of said step (4) when the step (4) provides the determination result that none of said reference pulses has been generated between the immediately preceding one of said crank angle pulses and the present one of same; and (6) rendering a decision that there exists abnormality in the occurrence of said reference pulses when the counting of said step (5) has been continually effected at every execution of the step (4) until the counted value reaches a predetermined value.

5. The method as claimed in claim 4, wherein said determination of said step (4) is effected when the rotational speed of said engine is higher than a predetermined value.

6. The method as claimed in claim 4, wherein said counting of said crank angle pulses is effected by the use of a ring counter having a number of counting steps equal to said predetermined value.

* * * * *